United States Patent [19]

Thiele

[11] 4,156,566
[45] May 29, 1979

[54] POSITION INDICATOR

[75] Inventor: Heinz Thiele, Schwarzenbek, Fed. Rep. of Germany

[73] Assignee: Rollei-Werke Franke & Heidecke, Braunschweig, Fed. Rep. of Germany

[21] Appl. No.: 817,169

[22] Filed: Jul. 20, 1977

[30] Foreign Application Priority Data

Aug. 14, 1976 [DE] Fed. Rep. of Germany ........ 2636739

[51] Int. Cl.² .............................................. G03B 17/18
[52] U.S. Cl. ..................................... 354/289; 307/400
[58] Field of Search ................. 354/289, 23 D, 43, 44, 354/273, 60 L, 60 E, 53; 307/88 ET

[56] References Cited

U.S. PATENT DOCUMENTS

| 3,711,852 | 1/1973 | Firnig | 307/88 ET X |
| 3,875,433 | 4/1975 | Uchikawa | 307/88 ET X |
| 3,950,775 | 4/1976 | Toyama et al. | 354/273 |
| 4,043,677 | 8/1977 | Toyoda | 354/53 X |

Primary Examiner—Michael L. Gellner
Attorney, Agent, or Firm—Stonebraker, Shepard & Stephens

[57] ABSTRACT

A position indicator is arranged for detecting and indicating the position of a member that is movable along a predetermined path in discrete steps as part of the diaphragm of a still camera. Elements that can produce an electrostatic field and can scan an electrostatic field are alternatively arranged so that a single one of the elements moves with the diaphragm member along a path past a plurality of the other elements positioned along the path. The scanning elements are arranged to operate a switch that can be switched with practically no consumption of power in response to the position of the member, and the switch is arranged to energize at least one indicating element. The electrostatic-field is preferably produced by an electret, the scanning element is preferably an electrode, and the switch is preferably an MOS field-effect transistor.

11 Claims, 5 Drawing Figures

POSITION INDICATOR

BACKGROUND OF THE INVENTION

The inventive position indicator is for detecting and indicating the position of a member that moves along a predetermined path in discrete steps as part of the diaphragm of a still camera. In one type of automatic still camera it is necessary for the automatic control of the diaphragm to determine the actual diaphragm stop position and feed this information as a train of pulses to a digital computer circuit. Diaphragms for such systems have a member that moves axially upon adjustment of the diaphragm and a previously known way of determining the diaphragm position was to use a screened lamp transmitting light through an opening in the moving diaphragm part so that the light would fall on a plurality of photoelectric cells arranged along the path of movement to determine the position of the diaphragm. Pulses from the photoelectric cells are fed to a counter that determines diaphragm position by the pulse count.

Such an arrangement is very expensive, requires a hermetically sealed light arranged within the camera and consumes considerable power, which unreasonably shortens the operating life of the power source required for operating other electronic components within the camera.

The present invention involves recognition of the problems involved in previous diaphragm-position detecting and indicating systems, and a realization of a way that such a system can be made more simply and economically to produce the desired result without consuming any substantial energy. The invention aims at simplicity, economy, reliability, and low power consumption for a diaphragm-position detecting and indicating device.

SUMMARY OF THE INVENTION

The inventive position indicator detects and indicates the position of a member that is movable along a predetermined path in discrete steps, the member being a movable member of a diaphragm of a still camera. A single first element is fixed to the movable member for movement along the path with the movable member, and a plurality of second elements are arranged in spaced relation along the path to correspond with a plurality of positions of the movable member to be detected. The first element and the second elements are also arranged so that the first element moves directly past the second elements as the diaphragm member moves. The first and second elements alternatively comprise means for producing an electrostatic field and means for scanning the electrostatic field so that if a movable element produces the electrostatic field, stationary elements scan the electrostatic field, and if a stationary element produces the electrostatic field, moving elements scan the electrostatic field. The device includes at least one indicating element and a switch that can be switched with practically no consumption of power. The scanning means is arranged to operate the switch in response to the position of the diaphragm member, and the switch is arranged to energize the indicating element. The electrostatic-field producing means is preferably an electret, the scanning means is preferably an electrode, and the switch is preferably an MOS field-effect transistor. The system preferably includes an indicating element corresponding to each position of the diaphragm member to be detected, and the system can also include a digital counter.

The extremely small current consumption of the inventive system draws very little energy from the camera battery by using electrostatic-field-producing and scanning means that do not consume battery power. With light-emitting diodes as indicating elements, and an MOS field-effect transistor serving as a switch, the inventive system can be miniaturized and operated both reliably and economically.

DESCRIPTION OF THE PREFERRED EMBODIMENT

Figure 1:
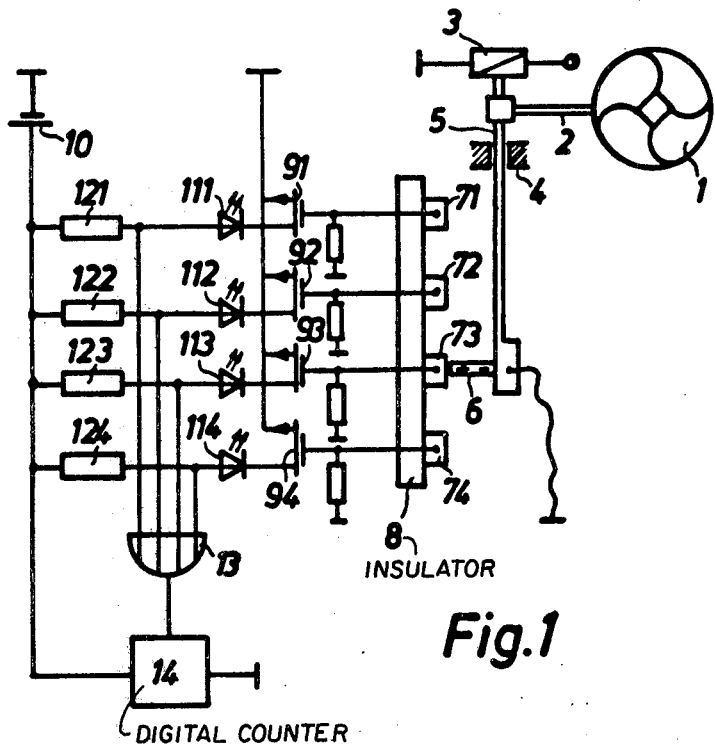
FIG. 1 is a schematic circuit diagram of one preferred embodiment of the invention using electrodes spaced along the path of movement of a diaphragm member.

In the embodiment of FIG. 1, the diaphragm 1 of a still camera is adjusted by an electromagnetic drive 3 via a diaphram pusher 2. The electromagnetic drive 3 is generally known and ordinarily formed as a cylindrical coil moving into a pot-shaped magnet to a greater or lesser extent, depending on the amount of energizing current fed to the magnet, and this movement closes the diaphragm 1 to a greater or lesser extent. The cylindrical coil is rigidly connected with a push rod 5 that is supported in a guide 4 and moves with the adjustment of the diaphragm 1.

An element 6 is mounted on the push rod 5 and in the embodiment of FIG. 1 is formed as an electret 6 for producing an electrostatic field. One side of the electret 6 is grounded, and the other end of the electret 6 moves directly past a plurality of electrodes 71–74 that are spaced apart by predetermined distances and arranged along the path of movement of the push rod 5 and the electret 6. The electrodes 71–74 are arranged on an insulator 8, and each electrode is connected with the gate of an MOS field-effect transistor 91–94.

The source connections of the MOS field-effect transistors are grounded. The drain connections of the MOS field-effect transistors are connected to indicating elements that are preferably formed as light-emitting diodes 111–114, connected via resistors 121–124 to the positive terminal of a battery 10 whose negative terminal is grounded. Each drain line of the MOS field-effect transistors 91–94 is tapped and connected with the inputs of an OR gate 13 having an output connected to the input of a digital counter 14. This allows detection of the position of the diaphragm 1 by counting pulses from the drain lines of the MOS field-effect transistors 91–94 in response to movement of the electret 6. The arrangement shown in FIG. 1 uses four electrodes 71–74 for detection and indication of four diaphragm stop positions.

With the diaphragm 1 fully opened, the electret 6 is directly in front of the electrode 71, and the electrostatic field of the electret 6 passes through the electrode 71 and produces in the electrode 71 a voltage with respect to ground that is used as the control voltage on the gate of the MOS field-effect transistor 91. The MOS field-effect transistor 91 then becomes conductive, and the maximum diaphragm aperture is indicated by the lighting up of the light-emitting diode 111. At the same time, the voltage drop at the resistor 121 passes as a positive pulse to the OR gate 13 and thus to the input of the digital counter 14. If the diaphragm drive 3 is energized for closing down the diaphragm aperture, the electret 6 moves along the electrodes 71 to 74. As soon as the electret 6 enters into the region of the next electrode, the next MOS field-effect transistor is actuated, the corresponding light-emitting diode lights up, and an additional pulse is fed to the counter 14 via the OR gate 13. Both the lighting up of a corresponding light-emitting diode and the number of pulses counted at the counter 14 form a measure or indication of the diaphragm opening position.

Figure 2:
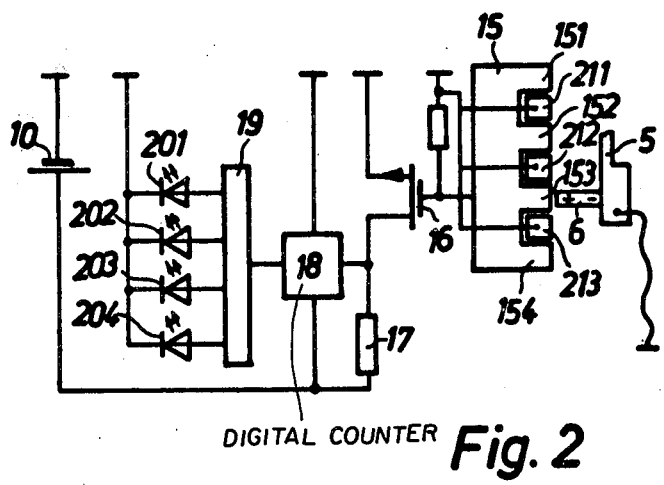
FIG. 2 is a schematic circuit diagram of another embodiment of the invention using a different electrode arrangement and a single switch.

The basic arrangement can be substantially simplified by electrically connecting the individual electrodes together and using a single switch as shown in FIG. 2. A conductive plate 15 is cut out to form a series of projections in a comb-like configuration, and the plate is connected with the gate of an MOS field-effect transistor 16. The drain of the MOS field-effect transistor includes a resistor 17, and a connection to the input of a digital counter 18 which is connected with a decoding matrix 19 to each of the outputs of which is connected a light-emitting diode 201-204.

The electret 6 is grounded on one side and fixed to the push rod 5 as explained above to move directly past the comb-like projections 151-154 of the plate 15, and the projections 151-154 function as electrodes in the same way as electrodes 171-174 of FIG. 1. In order to make the potential jump as large as possible as the electret 6 moves from one projection to the other, the fillers 211-213 are preferably inserted in the gaps between the projections 151-154, and the fillers 211-213 preferably consist of conductive material insulated from the conductive plate 15. The fillers 211-213 are grounded and form a screen so that the electrostatic field from electret 6 passes only through the nearby projection 153 and not through adjacent projections 152 and 154.

The arrangement of FIG. 2 operates in a similar way to the embodiment of FIG. 1 so that as the electret 6 moves past the projections 151-154 a voltage is produced in each projection, and each voltage produced makes the MOS field-effect transistor 16 conductive whenever the electret 6 passes directly in front of one of the projections 151-154. Conduction of the transistor 16 produces a pulse that is input to the digital counter 18 and is effective via the decoding matrix 19 to energize one of the light-emitting diodes 201-204 corresponding to the position of the electret 6 relative to the projections 151-154. The number of pulses is thus made visible by the lighting up of a corresponding light-emitting diode, and the pulses are also counted by the counter 18 and are fed to a computer circuit (not shown) for automatic control of the exposure.

Figures 3, 4:
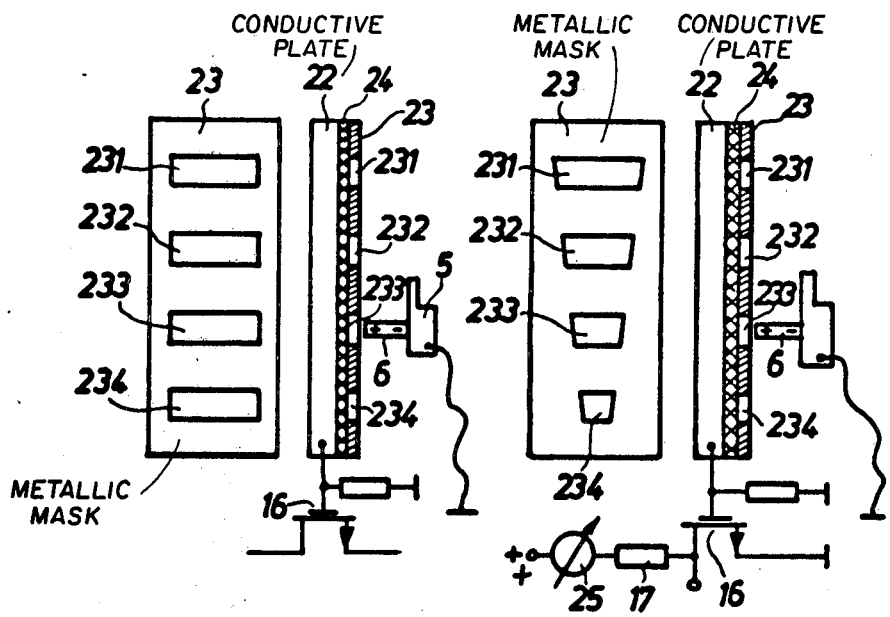
FIG. 3 is a combined plan view and side elevation of another electrode arrangement for practicing the invention.
FIG. 4 is a combined plan view and side elevation of another electrode arrangement for another embodiment of the invention using an analog indicator.

FIG. 3 shows another preferred way of forming electrodes for scanning the electrostatic field of the electret 6 so that the electrodes are properly arranged over the path of movement of the pusher rod 5. A conductive plate 22 extends along the path of movement of the electret 6, and the conductive plate 22 is connected with the gate input of the MOS field-effect transistor 16, which is arranged in a circuit such as shown in FIG. 2. A metallic mask 23 overlies the face of conductor plate 22 and is insulated from the plate 22 by an insulating layer 24. The metal mask 23 is grounded and is provided with a spaced series of openings 231-234 arranged longitudinally along the path of movement of the electret 6 in the same positions where electrodes 71-74 and 151-154 are arranged in the previously described embodiments. The grounded metal mask 23 then forms a screen for the electrostatic field from the electret 6 so that the electric lines of force penetrate through to the conductive plate 22 only when the electret 6 is directly in front of one of the openings 231-234. As this occurs, the MOS field-effect transistor 16 is actuated and produces a pulse that indicates the diaphragm opening as explained above relative to FIG. 2.

The electrode arrangement of FIG. 4 is similar to the arrangement of FIG. 3, except that the area of the openings 231'-234' in the mask 23 are progressively decreased in size with increasing distance along the path of travel of the electret 6. With such an arrangement, an analog measuring instrument 25 is connected in the drain circuit of the MOS field-effect transistor 16 to indicate the current value flowing through the transistor 16 as a function of the size of the opening 231'-234' at which the electret 6 is positioned. This arrangement also allows pulses for the counter 18 (FIG. 2) to be taken off at the resistor 17. For convenience of illustration, FIGS. 3 and 4 each include a plan view of the mask 23 on the left side of each figure, and a side view of the electrode configuration on the right side of each figure.

Figure 5:
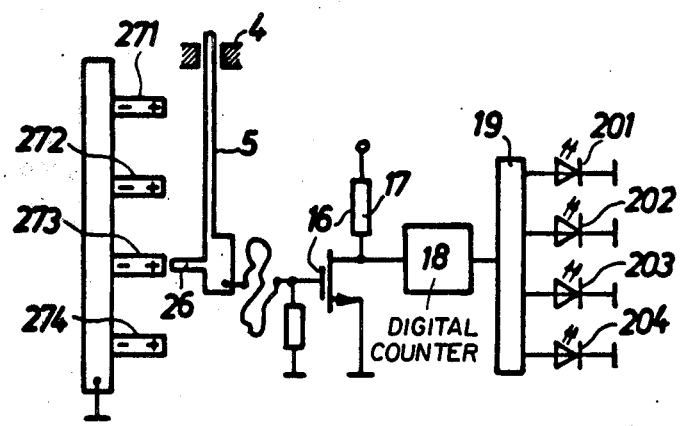
FIG. 5 is another embodiment of the invention using a plurality of electrostatic field producers and a single scanning electrode.

FIG. 5 shows another preferred embodiment of the invention using a single electrode and a plurality of electrets. The single electrode 26 is fixed on the diaphragm push rod 5 and moves in response to diaphragm setting as previously described for the electret 6. The electrode 26 is connected with the gate of an MOS field-effect transistor 16 arranged in a circuit in the same general way as shown in FIG. 2. A plurality of electrets 271-274 are spaced along the path of travel of the electrode 26 in the positions occupied by the electrodes described in the previous embodiments, and each of the electrets 271-274 produces an electrostatic field.

As the diaphragm member 5 moves along its discrete stop positions opposite the electrets 271-274, the electrode 26 scans the electrostatic field of the individual electrets and when the electrode 26 is approximately in the maximum strength of an individual electrostatic field from one of the electrets, it produces a control voltage pulse that makes the MOS field-effect transistor 16 conductive. This produces a pulse delivered to the counter 18 and effective via the decoding matrix 19 for energizing the light-emitting diodes 201-204. In order to limit the individual electrostatic fields of the electrets 271-274 in the spaces between each other, and to obtain a well-defined transition from one field to the next, the electrets 271-274 are preferably screened from each other.

Modifications of the illustrated preferred embodiments are possible within the scope of the invention. For example, the conductor plate 15 of FIG. 2 or the conductor plate 22 and metal mask of the arrangements of either FIG. 3 or FIG. 4 can be connected to the push rod 5, and the electret 6 can be fixed in space alongside the path of movement of the push rod 5. The inventive system can also be used for detecting and indicating other movements and can be associated with an exposure-time or distance-setting device such as a focusing ring, a focal length adjusting element, and other camera elements that are movable as part of an exposure-control system. Also, it is preferred according to the invention to combine the electrodes or field-scanning elements with the MOS field-effect transistors and their necessarily associated circuitry into a single microcircuit component for economy and saving in space. These can be formed on wafers or constructed with thin film or thick film techniques in generally known ways.

What is claimed is:

1. A position indicator arranged for detecting and indicating the position of a member that is movable along a predetermined path in discrete steps, said member being a movable member of a diaphragm of a still camera, and said position indicator being characterized by the fact that:
   a. a single first element is fixed to said movable member for movement therewith along said path;
   b. a plurality of second elements are arranged in spaced relation along said path to correspond with a plurality of positions of said movable member to be detected;
   c. said first element and said second elements are arranged so said first element moves directly past said second elements as said member moves;
   d. said first and second elements alternatively comprise means for producing an electrostatic field and means for scanning said electrostatic field;
   e. at least one indicating element is arranged for indicating a position of said movable member;
   f. switch means is included that can be switched with practically no consumption of power;
   g. said scanning means is arranged to operate said switch in response to the position of said member;
   h. said switch means is arranged to energize said indicating element;
   i. said means for producing said electrostatic field is formed as an electret;
   j. said means for scanning said electrostatic field is formed as electrodes connected with each other and to said switch means; and
   k. said electrodes are formed as a plurality of projections on a comb-like conductive plate extending along said path.

2. The position indicator of claim 1, wherein said switch means is formed as a MOS field-effect transistor and said plate is connected to the gate of said transistor.

3. The position indicator of claim 1 wherein said switch means is formed as an MOS field-effect transistor.

4. The position indicator of claim 1 wherein said switch means is formed as a plurality of MOS field-effect transistors, each of said electrodes is connected with the gate of a respective one of said transistors, and one of said indicating elements is arranged in the drain-source circuit of each of said transistors.

5. The position indicator of claim 4 including an OR gate and a digital counter arranged so that the outputs of said transistors are connected to the inputs of said OR gate and the output of said OR gate is connected with said digital counter.

6. The position indicator of claim 1 including conductive material insulated from said plate and arranged to fill gaps between said projections.

7. The position indicator of claim 1 including a conductive plate, a metal mask extending over said plate and insulated from said plate, and spaced openings in said mask creating regions of said plate within said openings to serve as said electrodes.

8. The position indicator of claim 1 wherein said second elements are formed as a plurality of said means for producing said electrostatic field, and said first element is formed as an electrode forming said means for scanning said electrostatic field.

9. A position indicator arranged for detecting and indicating the position of a member that is movable along a predetermined path in discrete steps, said member being a movable member of a diaphragm of a still camera, and said position indicator being characterized by the fact that:
   a. a single first element is fixed to said movable member for movement therewith along said path;
   b. a plurality of second elements are arranged in spaced relation along said path to correspond with a plurality of positions of said movable member to be detected;
   c. said first element and said second elements are arranged so said first element moves directly past said second elements as said member moves;
   d. said first and second elements alternatively comprise means for producing an electrostatic field and means for scanning said electrostatic field;
   e. at least one indicating element is arranged for indicating a position of said movable member;
   f. switch means is included that can be switched with practically no consumption of power;
   g. said scanning means is arranged to operate said switch in response to the position of said member; and
   h. said switch means is arranged to energize said indicating element;
   i. said means for producing said electrostatic field is formed as an electret;
   j. said means for scanning said electrostatic field is formed as electrodes connected with each other and to said switch means; and
   k. said indicator further includes a conductive plate, a metal mask extending over said plate and insulated from said plate, and spaced openings in said mask creating regions of said plate within said openings to serve as said electrodes.

10. The position indicator of claim 9 wherein said openings progressively change in size along the length of said path.

11. The position indicator of claim 10 wherein said indicating element is arranged to detect different currents, said switch means is formed as an MOS field-effect transistor, and said indicating element is arranged in the drain-source circuit of said transistor.

* * * * *